Patented Apr. 11, 1939

2,154,049

UNITED STATES PATENT OFFICE 2,154,049

CHLORINATION OF CYCLOHEXANE

Arthur A. Levine and Oliver W. Cass, Niagara Falls, N. Y., assignors to E. I. du Pont de Nemours & Company, Wilmington, Del., a corporation of Delaware No Drawing. Application April 21, 1936, Serial No. 75,648

6 Claims. (Cl. 260—648)

This application relates to the chlorination of cyclohexane. More particularly, it relates to the chlorination of cyclohexane under conditions such that the product consists essentially of monochlorcyclohexane, but relatively small amounts of the dichloride and higher chlorides being formed.

The cyclic compound cyclohexane, $C_6H_{12}$, has previously been chlorinated by various chemists. Markownikow found that cyclohexane could be chlorinated with a good yield of monochlorcyclohexane by using moist chlorine as the chlorinating agent, the chlorination being carried out in the cold using diffused sunlight as the activating agent. This chemist found that when using dry chlorine it was necessary to maintain the cyclohexane at some temperature near its boiling point. Fairly substantial yields of monochlorcyclohexane were obtained with either dry or moist chlorine but polychlorides in varying amounts were also present in the reaction product.

Since low temperature chlorination is usually more satisfactory than processes operating at more elevated temperatures, and in order to avoid the necessity of exposing the reactants to the activating influence of light, which in commercial operations is not always practical, many chemists have investigated the chlorination of cyclohexane with a view to obtaining chlorinated products which consisted predominantly of the monochloride at relatively low temperatures and in the dark. Thus Fortey used dry chlorine to chlorinate cyclohexane in the presence of iron as a catalytic agent. As a result of his experiments he found that the presence of light was essential but that lower temperatures could be used, room temperatures and temperatures below room temperature being maintained in the reaction vessel during his experiments. At room temperature Fortey found that no monochloride was produced and that for any substantial amount of monochlorcyclohexane to form it was necessary to cool the reaction mixture down to a relatively low temperature. As a result of these investigations, this chemist stated the rule which has been universally regarded as the correct rule governing the chlorination of cyclohexane with chlorine as the chlorination agent. Fortey found that "chlorination in the dark could not be effected while the application of heat or the employment of halogen carriers (catalysts) gave rise to the formation of higher substitution products such as di, tri and tetrachlorocyclohexanes."

Since mono-chlor cyclohexane was the product most desired by the art other chemists have from time to time attempted to chlorinate cyclohexane directly under conditions such that substantial amounts of the monochloride would result and higher chlorination products would be present in but small amounts. Among these were Sabatier and Mailhe, as well as Faragher and Laoner. These experimenters tried catalytic agents such as iodine and antimony pentachloride without success. When using dry chlorine at 0° C. in the presence of diffused sunlight as an activating agent a mixture of mono, di, tri, and tetrachlorcyclohexanes resulted, the monochlorcyclohexane being present in but small amounts. When aluminum chloride was utilized as a catalyst it was found that monochlorcyclohexane would result but the yield was materially reduced by the formation of higher boiling condensed products. Under these circumstances the art concluded that the use of catalytic agents for speeding up the chlorination of cyclohexane in the process of chlorinating cyclohexane under conditions such that substantial amounts of monochlorcyclohexane were formed, was not practical. Wherever monochlorcyclohexane was desired from cyclohexane as the initial starting material, it was necessary to employ a non-catalytic process using a method similar to that of Markownikow, contacting chlorine and cyclohexane in the cold, using diffused daylight as an activating agent. This process, since it is carried out at low temperatures and without a catalytic agent, is relatively slow, and when the quantity of chlorine absorbed exceeded about 30% of that quantity necessary theoretically to convert all the cyclohexane to the monochlor stage, the yield of monochlorcyclohexane was materially reduced, the formation of higher chlorinated products occurring to a very substantial degree.

We have now found that it is possible to chlorinate cyclohexane in the presence of a catalytic agent under conditions such that the product consists predominantly of monochlor cyclohexane. Moreover, we have found that diffused daylight is not necessary and that moderately elevated temperatures may be used. The necessity of permitting light to have access to the reaction mass is objectionable in most commercial processes for it necessitates the employment of glass apparatus and the immersion, in the reaction mixture, of a source of light such as a mercury vapor lamp. We have now found that cyclohexane can be chlorinated to the monochlor stage under conditions such that good yields of the monochloride are produced in the presence of a catalytic agent whether or not the contents of the reaction mixture are exposed to the activating action of light. Moreover, relatively high temperatures may be used thus speeding up the chlorination. Generally we have found that when the process is carried out in the dark in the presence of our novel catalytic agent, the chlorination is relatively slow but very smooth, the yields of monochlor cyclohexane in the chlorinated product approaching 90%. When the chlorination is carried out in the presence of light we have found that a temperature of only 30° C. is necessary to maintain a chlorination rate of 10% per hour. This is to be contrasted with the non-catalytic processes universally employed in the chlorination of cyclohexane wherein it is necessary to carry out the reaction at 50° C. in order to obtain a reaction rate of 10% per hour.

Accordingly, it is one of the objects of this invention to chlorinate cyclohexane, using chlorine as the chlorinating agent, under conditions such that the product consists predominantly of the monochloride, but very small amounts of the di and tri and higher chlorides being formed. Moreover, it is another object of this invention to carry out this chlorination under conditions wherein a catalytic agent is present. It is still another object of this invention to develop a method wherein the chlorination rate is fairly rapid, whether the contents of the reaction vessel are exposed to the activating action of light or not. Other objects of this invention include the development of a process wherein the chlorination occurs rapidly and with yields of monochlorcyclohexane which approach 90% of the theoretical. These and still other objects of the invention will be apparent from the ensuing disclosure of a preferred method for carrying out our novel process.

The catalytic agent which we employ is stannic chloride, preferably anhydrous stannic chloride, $SnCl_4$. This catalyst may be purchased from commercial sources or it may be readily prepared by blowing chlorine through tin scrap. Stannic chloride is formed and since this product is a liquid it is distilled over and may be condensed in a substantially pure state.

We have found that for best results the stannic chloride catalyst should be present in amounts ranging from 0.5 to 5% by weight, based upon the weight of the cyclohexane to be chlorinated. Chlorine is blown through the mixture of cyclohexane and catalytic agent. Ordinarily we prefer that the temperature shall not exceed about 40° C. in order to reduce the possibility of di and higher chlorides forming. The reaction mixture may be exposed to diffused sunlight or to the light of a mercury vapor lamp or to some other source of light, although, as previously stated, it is not necessary to carry out our process in the presence of light.

In the dark the chlorination is slow but smooth, while in the presence of light the chlorination rate is somewhat faster but the yield of monochloride in the chlorinated product is somewhat reduced. Even when the reaction is carried out in the presence of diffused sunlight, however, we have found that yields of over 80% of monochlorcyclohexane result. When employing sunlight as the activating agent it is advisable to carry out the reaction in a lead vessel, as we have found that under these conditions the formation of the dichloride and higher chlorides is reduced to a minimum.

As an example of our improved process for the preparation of monochlorcyclohexane in substantial yields by the chlorination of cyclohexane, the following may be given:

Example I

Cyclohexane admixed with about 3% of anhydrous stannic chloride was subjected to the action of dry chlorine under conditions wherein access of light to the reactants was prevented. The chlorination was slow but smooth, the temperature being maintained at about 40° C. When 38% of the quantity of chlorine necessary to convert all of the cyclohexane to the monochloride stage had been absorbed, the chlorination was stopped and the reaction mixture subjected to fractional distillation. It was found that over 89% of the chlorinated product was monochlorcyclohexane while dichlorcyclohexane was present to the extent of less than 10%. Higher chlorinated products were not found in the reaction mixture in appreciable amounts.

Example II

Cyclohexane admixed with about 1% of anhydrous stannic chloride as a catalyst was subjected to the action of dry chlorine. The mixture was exposed to the light from a 200 watt lamp during the chlorination. The reaction was carried out in a lead-lined vessel and a temperature of about 30° C. was maintained.

The reaction rate was fairly rapid, about 10% of the cyclohexane present being chlorinated each hour that the process was continued. When about 53% of the chlorine necessary to convert all of the cyclohexane to the monochlor stage had been absorbed the reaction was stopped and the product separated by fractional distillation. The yield of monochloride was about 82.5% of the chlorinated product, and but very small amounts of the dichloride and higher chlorides were found in the reaction mixture.

In its broadest aspects our process involves the use of anhydrous stannic chloride as a catalyst in the chlorination of cyclohexane under conditions wherein the chlorinated product consists predominantly of monochlorcyclohexane. Our invention is not to be restricted to any particular proportions nor to any precise method of procedure, but is of broad general application wherever cyclohexane is to be chlorinated under conditions such that that part of the cyclohexane chlorinated is converted substantially entirely to monochlorcyclohexane, the amounts of the dichloride and higher chlorides formed being reduced to an insignificant amount.

We claim:

1. A process for preparing monochlorcyclohexane which comprises subjecting cyclohexane to the action of chlorine in the presence of anhydrous stannic chloride as a catalytic agent.

2. A process for preparing monochlorcyclohexane in substantial yield which comprises subjecting cyclohexane to the action of chlorine in the presence of anhydrous stannic chloride as a catalytic agent and in the presence of light as an activating agent.

3. A process for preparing monochlorcyclohexane by the chlorination of cyclohexane under conditions such that the quantity of dichlorcyclohexane and higher products formed is reduced to a relatively small amount, which comprises reacting chlorine and cyclohexane in the presence of anhydrous stannic chloride as a catalyst.

4. A process for preparing monochlorcyclohexane by the chlorination of cyclohexane under conditions such that higher chlorinated products are not formed in large amounts, which comprises reacting chlorine and cyclohexane in a lead reaction vessel, in the presence of anhydrous stannic chloride as a catalyst, and in the presence of light as an activating agent.

5. A process for preparing monochlorcyclohexane by the chlorination of cyclohexane under conditions such that the major portion of the cyclohexane chlorinated is converted to the monochlorcyclohexane stage which comprises reacting cyclohexane and chlorine at a temperature not substantially in excess of 40° C. and in the presence of stannic chloride as a chlorination catalyst.

6. A process for preparing monochlorcyclohexane by the chlorination of cyclohexane under conditions such that the major portion of the cyclohexane chlorinated is converted to the monochlorcyclohexane stage which comprises reacting cyclohexane and chlorine at a temperature not substantially exceeding about 40° C. in the presence of from 0.5% to 5% of stannic chloride as a catalyst, said amount being by weight, based on the weight of the cyclohexane present.

ARTHUR A. LEVINE.
OLIVER W. CASS.